Patented Dec. 14, 1937

2,102,205

UNITED STATES PATENT OFFICE 2,102,205

CELLULOSE MIXED ETHERS AND PROCESS FOR THE PREPARATION THEREOF

Joseph F. Haskins, Wilmington, and Deane C. Ellsworth, deceased, late of Wilmington, Del., by Joseph F. Haskins, administrator, Wilmington, Del., assignors to E. I. du Pont de Nemours & Company, Wilmington, Del., a corporation of Delaware No Drawing. Application January 23, 1936, Serial No. 60,520

10 Claims. (Cl. 260—152)

This invention relates to cellulose ethers, more particularly cellulose mixed ethers, and a process for the preparation thereof.

It is well known among investigators in the field of cellulose derivatives that many ethers of cellulose which are theoretically possible cannot or have not been made by the process used to prepare ethyl or methyl cellulose or benzyl cellulose. Furthermore, in order to make many cellulose ethers, conditions must be used which result in extreme degradation of the cellulose and very low-viscosity products. If, for example, cellulose is treated in the presence of alkali with butyl, amyl, hexyl, lauryl or "Lorol" chloride, the reaction is extremely sluggish and increasingly long periods of heating and high temperatures are necessary in order to get the cellulose ether. In the case of "Lorol" chloride, we have never been able to find any evidence of reaction. While such heating is going on, profound degradation takes place because of the action of the alkali on cellulose.

It is an object of this invention to produce new and improved cellulose mixed ethers. A further object is the preparation of new and improved cellulose mixed ethers containing as one substituent a group derived from an alkylating agent insoluble in water. Another object is the preparation of such ethers in a state of high quality with a minimum degree of degradation of the cellulose. A still further object is the preparation of new and improved cellulose mixed ethers containing higher aliphatic groups and lower aliphatic groups, particularly aliphatic hydrocarbon groups derived from alcohols formed by the reduction of mixed acids obtained from common oils and fats. An additional object is the provision of a new and improved process for producing products of the type above described. Another object is the provision of a new and improved process for producing such products by a reaction which proceeds smoothly and gives the desired products in high yields. Other objects will appear hereinafter.

In accomplishing these objects according to this invention, it has been found that the very sluggish etherifying agents which are normally water-insoluble may be brought to reaction readily with a partially substituted lower alkyl ether of cellulose. It has been found, moreover, that the degree of this preliminary etherification is of critical importance, and in the preparation of cellulose mixed ethers containing higher aliphatic hydrocarbon groups the degree of preliminary etherification with a lower alkylating agent should preferably be such as to carry the so etherified cellulose past the stage where it is alkali- or water-soluble, or at least to a stage where it is highly swollen by and preferentially wet by the higher aliphatic etherifying agent or by the diluent present.

In practising the invention, it is preferable to produce first a lower alkylated cellulose containing more than about 0.5 mole, and preferably within the range of 0.6 to 1.75 moles, of a lower alkyl group for each glucose unit of the cellulose. This may be effected, for example, by reacting a lower alkyl halide, preferably ethyl chloride, or a lower alkyl sulfate, preferably ethyl sulfate, with an alkali cellulose until the desired proportion of lower alkyl groups has been substituted in the cellulose molecule, and then reacting the lower alkylated cellulose with a water-insoluble alkyl halide containing, for example, four or more carbon atoms and, preferably eight to eighteen carbon atoms, in the presence of an acid-binding agent.

The process has been especially advantageous in the preparation of "Lorol" ethyl cellulose and "Stenol" ethyl cellulose from monoethyl cellulose and "Lorol" chlorides and "Stenol" chlorides, respectively. The term "Lorol" is used to define the mixture of alcohols produced from coconut oil by catalytic hydrogenation and the mixture of alkyl halides corresponding thereto (see "Journal of Society of Dyers and Colorists", vol. 48, page 129, 1932). Similarly, the term "Stenol" is applied to the alcohols obtained by the reduction (including hydrogenation of double bonds) of the acids derived from sperm oil and to the corresponding alkyl halides.

According to the preferred method of producing ethyl ethers of cellulose containing higher aliphatic hydrocarbon groups such as, for example, "Lorol" or "Stenol" groups, the cellulose is steeped in 18–50% sodium hydroxide, pressed to a suitable weight and shredded. The resultant alkali cellulose is then treated with about 3 moles of ethyl chloride or 4–5 moles of ethyl sulfate, at a temperature of about 100° C. in the first case and about 25° C. in the second case, until a monoethyl cellulose is formed. The higher aliphatic alkylating agent is then added and a suitable diluent may also be added (in the case of "Lorol" chloride, no diluent is necessary). The reaction is continued at a higher temperature which depends upon the etherifying agent used, temperatures of about 150° C. to about 160° C. being preferred for "Lorol" and "Stenol" chlorides. When the preliminary etherification has been carried to the order of 0.5 mole of ethyl, or more, the second and final etherification is found to take place with relative ease, without any substantial degradation of the cellulose and in practically theoretical yields, in marked contrasts to the difficulty or absence of any substitution and the pronounced degradation which takes place when cellulose itself is heated with higher alkyl halides in the presence of alkali and water.

The invention will be further illustrated, but is not limited, by the following examples in which the quantities are stated in parts by weight unless otherwise indicated.

*Example I*

One thousand sixty (1060) parts of cotton linters containing 1000 parts of alpha-cellulose were steeped in 42.6% sodium hydroxide solution at 20° C. for two hours, pressed to 8020 parts and shredded for two hours with the addition of 60 parts of a wetting and penetrating agent comprising essentially the product obtainable by sulfating and neutralizing coconut oil alcohols in which lauryl alcohol preponderates, marketed under the trade name of "Gardinol".

A mixture of 2675 parts of the above alkali cellulose (molar ratio 1 of cellulose to 12 of NaOH to 36 of water), 1260 parts of "Lorol" chloride (3 moles for each glucose unit of the cellulose) and 354 parts of ethyl chloride (3 moles for each glucose unit of the cellulose) was placed in a nickel-lined steam-jacketed autoclave from which the air was displaced by nitrogen, and heated in two temperature stages. During the first stage, the contents of the autoclave were heated to 112° C., at which temperature the exothermic ethylation reaction began and the steam was completely shut off. During the course of the succeeding four hours, the temperature rose to 130° C. and fell back to 112° C., where it was maintained for three hours more. A sample of the contents of the kettle, taken at this point, purified and analyzed, showed approximately 0.7 mole of ethyl introduced for each glucose unit of the cellulose, and no detectable "Lorol" group. The contents of the autoclave were then heated to 150° C. and kept at this temperature for thirty-three hours to effect the reaction with the "Lorol" chloride.

When the cooled contents of the autoclave were removed, a quantity of dark, aqueous liquor was separated from the reaction mixture and discarded. To the rest of the material, acetone was slowly added, with stirring, to effect a thick, smooth solution. More acetone was then added until the "Lorol" ethyl cellulose precipitated. This precipitate was washed with acetone, then with water till nearly alkali-free, suspended in 0.5% HCl overnight, washed again with water until neutral, then repeatedly extracted with acetone. It was then air-dried. The yield was about 635 parts (208% based on the alpha-cellulose) of a white, waxy powder softening at 85° C. and soluble in toluene or molten paraffin. Analysis showed the presence of 0.61 ethyl group and 1.35 "Lorol" groups for each glucose unit of the cellulose nucleus.

When, in the above example, instead of 3 moles of "Lorol" chloride and 3 moles of ethyl chloride, 6 moles of "Lorol" chloride and no ethyl chloride were used, the product was fibrous cellulose containing no substituent so far as could be determined analytically, and very greatly degraded. With one mole of ethyl chloride and 5 moles of "Lorol" chloride, a degraded ethyl cellulose was formed which was partly water- or alkali-soluble. Analysis did not indicate any content of "Lorol". With 2 moles of ethyl chloride and 4 moles of "Lorol" chloride, a product was obtained, a very small part of which was soluble in organic solvents, the remainder being a degraded, partially ethylated cellulose. While with about 2.5 moles of ethyl chloride with 3.5 moles of "Lorol" chloride, a partly soluble "Lorol" ethyl cellulose was obtained, but in poor yield, the insoluble portion containing little, if any, "Lorol" groups.

*Example II*

Using the same process as in Example I, but replacing one-third of the "Lorol" chloride with a like amount of kerosene, a product was obtained which was soluble in toluene, kerosene, or hot paraffin. Analysis showed the presence of .91 ethyl group and .91 "Lorol" group for each glucose unit of the cellulose nucleus.

*Example III*

An alkali cellulose was prepared containing a molar ratio of one mole of cellulose, 4.6 moles of NaOH and 10.3 moles of water by steeping 100 parts of cotton linters in 50% NaOH solution for two hours at 25° C., pressing to 328 parts and shredding for one-half hour. While this alkali cellulose was still in the shredder, 380 parts (3 moles) of diethyl sulfate were slowly added and the shredding continued for sixteen hours at room temperature. A sample removed and purified showed an ethoxyl content of 1.31 groups for each $C_6$ unit of the cellulose. One hundred twenty-two (122) parts (5 moles) of solid sodium hydroxide were then shredded into the mass for two hours and 780 parts of the resulting mixture put into a nickel autoclave together with 261 parts (25 moles) of water and 284 parts (2 moles) of "Lorol" chloride. After heating for seven hours at 150° C., the reaction product was purified as in Example I. This product was soluble in toluene but not in kerosene or molten paraffin.

*Example IV*

One hundred fifty-nine (159) parts of cotton linters were steeped for two hours at 25° C. in 42.6% NaOH solution, pressed to 1184 parts (molar ratio 1 cellulose:12 NaOH:36 $H_2O$), and shredded for one and one-half hours with 10 parts of "Gardinol". This alkali cellulose was mixed with 405 parts (3 moles to 1 of $C_6H_{10}O_5$) of octyl chloride, 177 parts (3 moles to 1 of $C_6H_{10}O_5$) of ethyl chloride, and 250 parts of kerosene, placed in a nickel-lined autoclave and heated at 110°–120° C. for five hours, after which the heating was continued at 150°–155° C. for eleven hours. The reaction product was purified as in Example I. It was a white powder insoluble in kerosene but soluble in a mixture of toluene and alcohol.

*Example V*

(a) An alkali cellulose was made by steeping cotton linters in 50% sodium hydroxide solution for two hours at 20° C., pressing to 3.98 times the weight of the cellulose, and shredding at 12° C. for one and one-half hours.

To 1194 parts of the above alkali cellulose there were added slowly, while shredding at 12° C., 1428 parts of freshly distilled diethyl sulfate. The mixture was then allowed to warm up to 25° C. and shredding continued at this temperature for seventeen hours. The ethyl cellulose thus formed was purified by repeated washing in hot water and dried. The yield was 360 parts of a white, fibrous ethyl cellulose containing 1.14 ethoxyl groups for each glucose unit of the cellulose.

(b) A mixture of 330 parts of the above ethyl cellulose, 1200 parts of "Lorol" chloride, 20 parts of Turkey red oil, and a cooled solution of 418 parts of sodium hydroxide in 751 parts of water (molar ratio ethyl cellulose 1, "Lorol" chloride 3, sodium hydroxide 6, and water 24) was placed in a nickel-lined autoclave in the above-mentioned order and, after displacing the air in the autoclave with nitrogen, was heated at 150°–155° C. for fifteen hours. The reaction product was purified as in Example I. After drying at 65° C., there were obtained about 500 parts of a white powder that softened at 80° C. and contained 1.1 "Lorol" groups for each glucose unit of the cellulose. This material dissolved readily in toluene, kerosene or molten paraffin. A sample removed from the autoclave after ten hours' heating contained 0.89 "Lorol" and 0.98 ethyl group for each $C_6$ unit of the cellulose, and was soluble in toluene but not in kerosene or molten paraffin. The yield was about 160% of the weight of the ethyl cellulose.

The two following examples show the critical importance of the degree of substitution by the lower alkylating agent on the reaction with the higher alkylating agent.

Example VI

The procedure was the same as in Example Vb except that an ethyl cellulose containing only 0.4 mole of ethyl for each 6 carbon atoms of the cellulose was used as the intermediate. The product resulting from the treatment with "Lorol" chloride was a fibrous material soluble in alkali and insoluble in organic solvents. Analysis showed no appreciable "Lorol" groups. The yield was considerably under 100% of the weight of the ethyl cellulose.

Example VII

The procedure was the same as in Example Vb except that an ethyl cellulose containing about 0.6 mole of ethyl for each 6 carbon atoms of the cellulose was used as the intermediate. After the reaction with "Lorol" chloride, the product was purified. A yield of slightly over 100% of the weight of the ethyl cellulose used was obtained, the product being only partially soluble in organic solvents.

Example VIII

One hundred thirty (130) parts of wood pulp (6% moisture) were steeped in 42.6% sodium hydroxide solution for two hours at 20° C., pressed to 930 parts and shredded for two hours at 25° C., with the addition of 10 parts of "Gardinol". This alkali cellulose was put into a silver-lined autoclave, 145 parts of ethyl chloride (3 moles) and 857 parts of "Stenol" chloride (4 moles) of a mixture of alkyl halides containing 12.6% chloride) added, the air flushed out with nitrogen and the mixture heated, while stirring, for six hours at 112°–125° C., then at 150° C. for eight hours. After cooling, the reaction product was purified as in Example I. This gave about 240 parts of a white solid, soluble in hydrocarbons including benzene, toluene and kerosene, softening at 85° C., and containing, by analysis, 0.75 ethyl group and 1.07 "Stenol" groups for each 6 carbon atoms of the cellulose nucleus.

Example IX

One hundred (100) parts of cotton linters pulp were steeped in 50% sodium hydroxide solution for one and one-half hours at 20° C., pressed to 328 parts and shredded for two hours at 25° C., 122 parts of solid sodium hydroxide being shredded in. This alkali cellulose was placed in a nickel-lined autoclave, 300 parts of ethyl chloride, 152 parts of "Lorol" chloride and 567 parts of benzene added, and the mixture heated rapidly up to 145° C. It was held at this temperature for two and one-half hours, and then heated for six hours at 150° C. The reaction mixture was poured into low-boiling petroleum ether with good stirring, filtered and washed with petroleum ether. It was then filtered and added to an excess of hot water, while stirring. The product was then washed with hot water till free from alkali. This gave a "Lorol" ethyl cellulose softening at 100° C., soluble in ethanol, methanol, dioxane, ether, ethyl acetate, butyl alcohol and toluene, but insoluble in aliphatic hydrocarbons. Analysis showed an ethoxyl content of 38.36% and a carbon analysis of 58.57%, corresponding to 0.15 "Lorol" group and 2.09 ethyl groups for each 6 carbon atoms of the cellulose.

Example X

One hundred seventy (170) parts of cotton linters pulp, containing 162 parts of cellulose was steeped in 30% sodium hydroxide solution at 25° C. for two hours and pressed to 696 parts. This alkali cellulose was shredded for two hours at 25° C. Two hundred fifty-two (252) parts (2 moles) of dimethyl sulfate were slowly added through a dropping funnel, while shredding was continued. The shredding was continued for eighteen hours. At the end of this time, the mixture was placed in an autoclave, together with 10 parts of "Gardinol", 638 parts of "Lorol" chloride and a cold solution of 320 parts of NaOH in 468 parts of water. This mixture was heated, with stirring, for fifteen hours. There resulted a thick, jelly-like mass, with a separate aqueous layer. The latter was drawn off and discarded. The product was then purified with acetone and water, as described in Example I, and dried. The dried "Lorol" methyl cellulose was soluble in toluene 80—alcohol 20. Analysis showed 13.38% methoxyl and 64.91% carbon, equivalent to 1.39 methyl groups and 0.83 "Lorol" group for each glucose unit of the cellulose.

Example XI

Eighty-one (81) parts of oven-dried cotton linters pulp were steeped for one and one-half hours in 50% sodium hydroxide solution, pressed to 407 parts and shredded for one and one-half hours. The alkali cellulose was transferred to a nickel autoclave, 375 parts of n-butyl chloride and 63 parts of dimethyl sulfate added. The temperature was raised to 60° C. and held there for two hours, while stirring. The temperature was then raised to 150° C. and held there for three hours. After cooling, the contents of the autoclave were washed with water until free from alkali. The product was a methyl-butyl cellulose, practically completely soluble in hot methanol and insoluble in water.

Example XII

Ninety-nine parts of cotton linters were steeped in 35% sodium hydroxide solution and pressed to 714 parts; 20 parts more of the 35% sodium hydroxide solution were added and the alkali cellulose shredded. This gave an alkali cellulose having the molar ratio of 1 of cellulose (C₆H₁₀O₅) : 9 of NaOH : 37.25 of H₂O. This was stored at −5° C. until ready for use. After two days, the alkali cellulose was put into a nickel autoclave equipped for stirring, 82 parts of ethyl chloride, 436 parts of butyl chloride and 300 parts of benzene were added, and the mixture heated to 150° C. and maintained at that temperature for six hours. The resulting mixture was removed from the autoclave, one part of Turkey red oil was added and 500 parts of water. The benzene was distilled off with steam and the product washed with water until alkali-free. This gave an ethyl-butyl cellulose which would dissolve in chloroform and many other organic liquids to give high-viscosity solutions from which soft, flexible films could be cast. A 10% solution in chloroform had a viscosity of 36.2 poises.

Similarly, amyl-ethyl cellulose may be prepared by following the above procedure except that, instead of 436 parts of butyl chloride, 500 parts of amyl chloride are used.

The cellulose used may be cotton linters, wood pulp, or transformation products of cellulose such as hydrocellulose or oxycellulose.

The molecular ratios of alkali to water in the alkali cellulose has a bearing on the quality of the ether formed. In general, we prefer to use a ratio of one mole of alkali to about 3 moles of water, or one of cellulose to 6–16 of alkali to 18–48 of water, a relatively high water ratio leading to products of high viscosity. We do not confine ourselves to these ratios, however, and alkali-water ratios of 1:2 or 1:4 may be useful. In the examples, the alkali cellulose may be aged for a long or a short time, if desired, in order to give an additional control over the viscosity characteristics of the product.

The alkylating agents employed in the first step are lower alkylating agents such as, for example, methyl or ethyl halides (particularly the chlorides) or sulfates.

In the second step, a wide variety of higher alkylating agents may be employed. Preferred examples are hexyl, heptyl, octyl, nonyl, decyl, undecyl, dodecyl, tetradecyl, hexadecyl, octadecyl, octadecenyl (oleyl) and myricyl chlorides; also, mixtures of such chlorides, e. g., "Lorol" chloride, "Stenol" chloride. The corresponding bromides or iodides may also be used. As already indicated, the reaction is particularly suited to the preparation of cellulose ethers where mixed alkyl halides such as may be prepared from mixed alcohols produced by the reaction of the mixed acid obtained by hydrolysis of various commercial oils and fats, are used.

The amounts of etherifying agents employed in the two stages will vary depending largely upon the desired degree of alkylation. Thus, the amount of lower alkyl group introduced into the cellulose molecule may be, for example, 0.5 to 2.5 moles for each glucose unit. The amount of higher aliphatic hydrocarbon group introduced into the cellulose molecule may be, for example, 0.05 to 2 moles for each glucose unit. It will be recognized that the degree of alkylation with the higher alkyl group will depend to some extent upon the number of lower alkyl groups present, the maximum total being the number of hydroxyl groups in the cellulose molecule. To obtain the desired degree of lower alkylation, it is usually desirable to employ at least two moles of the lower alkylating agent, and preferably about three moles for each glucose unit in the cellulose molecule in the first-stage reaction mixture. Higher proportions may be employed, if desired. The amount of higher alkylating agent present in the second-stage reaction should preferably also be about three moles for each glucose unit, although as indicated by the examples, higher or lower molar proportions may be employed.

The mixed ethers of cellulose containing at least 0.5 mole of lower alkyl group and one or more moles of higher alkyl group per each C₆ unit are normally soluble not only toluene but, also, in kerosene and molten paraffin. The products having less than a mole of higher aliphatic group (compare Example V) may be soluble in toluene but are not usually soluble in kerosene or molten paraffin.

The acid-binding agent present during the reaction is normally an alkali such as employed in the preparation of the alkali cellulose, e. g., an alkali metal hydroxide.

The reaction may be effected in the presence of any inert diluent or solvent such as, for example, kerosene.

The preparation of the alkali cellulose and the alkylations may be carried out in the presence of wetting or penetrating agents, as, for example, Turkey red oil, sulfuric esters of higher alcohols (e. g., coconut oil alcohols), true sulfonates of higher alcohols and long chain hydrocarbons, and related compounds and compositions containing them. Suitable sulfuric esters and sulfonates are described in U. S. Patents Nos. 1,968,793; 1,968,794; 1,968,795; 1,968,796 and 1,968,797.

The temperatures used will vary with the etherifying agents. Suitable temperatures for lower alkylations are, in general, known to those skilled in the art. For example, in the first step 100° C. with ethyl chloride, or 25° C. with ethyl sulfate is suitable. In the second step a higher temperature, as, for example, within the range of 140°–200° C. and preferably from about 150° C. to about 160° C., is suitable in most cases.

The reaction time is variable depending upon the proportions of the various reagents and the temperatures. For the first step, three to six hours is ordinarily sufficient. In the second step, the reaction time may vary, for example, from three to thirty hours. The reaction time varies also with the proportions of the materials, a large batch requiring longer heating time. This may possibly be a matter of heat transfer. In the second stage, long continued heating of the partly etherified cellulose has little effect on the viscosity of the product, and it seems probable that little degradation occurs during this step. This is in marked contrast to the lack of substitution and pronounced degradation which takes place when cellulose itself is heated, in the presence of alkali, water and the higher alkyl halide.

The two steps may be carried out in a number of different ways. The partially etherified cellulose resulting from the first step may be isolated, washed and dried before using in the second step. Or, the autoclave may be opened after completion of the primary etherification, the second reagent added and etherification continued. In the case of a relatively inert alkyl halide in the second step, both etherifying agents may be added at the first of the reaction and etherification carried out in two temperature stages, as 100° C., at which temperature ethyl chloride will react but the higher alkyl halides will not, and, after completion of the ethylation, 150° C. for "Lorolation", in the preparation of "Lorol" ethyl cellulose.

The higher alkyl mixed ethers prepared in accordance with the present invention are of good quality and are useful for many purposes to which cellulose ethers are now applied as, for example, in plastics and lacquers.

These mixed ethers of cellulose containing higher aliphatic hydrocarbon groups possess some properties, such as solubility in kerosene and hot paraffin, which the lower alkyl ethers of cellulose do not have. Hence, the mixed ethers of the present invention have certain advantages over the lower alkyl ethers of cellulose.

The process is advantageous in providing a simple and direct method of producing mixed ethers of cellulose containing higher alkyl groups in good yield and in good quality with minimum amounts of reagents. When the higher alkyl group contains eight or more carbon atoms, the preliminary etherification is apparently essential in order to bring about the introduction of any appreciable quantity of higher alkyl group. In the case of the alkyl groups containing an intermediate number of carbon atoms, as four or five, the effect of a preliminary etherification with methyl or ethyl is not quite so great, in as much as it is possible to introduce butyl or amyl groups without the preliminary etherification. On the other hand, in order to make butyl cellulose by action of butyl chloride on alkali cellulose, for example, such severe etherification conditions (high temperature and long time) are necessary that only degraded ethers of low viscosity can be obtained. Preliminary etherification with ethylating or methylating agents will, in such cases, enable the reaction to proceed without such severe degradation, and mixed ethers of high viscosity can be prepared.

By "lower alkyl" is meant methyl or ethyl, and by "higher alkyl" is meant alkyl groups or mixtures including two or more alkyl groups having eight or more carbon atoms. The radicals such as butyl and amyl are regarded as intermediate between the lower and the higher alkyl radicals.

As many apparently widely different embodiments of this invention may be made without departing from the spirit and scope thereof, it is to be understood that we do not limit ourselves to the specific embodiments thereof, except as defined in the appended claims.

We claim:

1. In a process of producing mixed ethers of cellulose, the step which comprises reacting a lower partially alkylated cellulose, containing at least 0.5 mole of a lower alkyl group having less than three carbon atoms for each glucose unit of the cellulose, with a higher alkyl halide containing eight to eighteen carbon atoms, in the presence of an alkali.

2. In a process of producing mixed ethers of cellulose, the step which comprises reacting a lower alkylated cellulose, containing from about 0.5 to about 1.75 moles of a lower alkyl group having less than three carbon atoms for each glucose unit of the cellulose, with a higher alkyl halide containing eight to eighteen carbon atoms, in the presence of an alkali.

3. In a process of producing mixed ethers of cellulose, the step which comprises reacting a lower alkylated cellulose containing from about 0.5 to about 1.75 moles of a lower alkyl group having less than three carbon atoms for each glucose unit of the cellulose, with a higher alkyl chloride containing eight to eighteen carbon atoms, in the presence of an alkali metal hydroxide at a temperature within the range of about 150° C. to about 160° C.

4. In a process of producing mixed ethers of cellulose, the step which comprises reacting a lower alkylated cellulose containing from about 0.5 to about 1.75 moles of a lower alkyl group having less than three carbon atoms for each glucose unit of the cellulose, with "Lorol" chloride, in the presence of an alkali metal hydroxide.

5. The process of preparing "Lorol" ethyl cellulose which comprises heating together an alkali cellulose, ethyl chloride and "Lorol" chloride in two temperature stages, the proportions of ethyl chloride and "Lorol" chloride each corresponding to about three moles for each glucose unit of the cellulose, the first temperature stage including a temperature range above 100° C. but not higher than about 130° C., and the second temperature stage being about 150° C. to about 160° C.

6. Mixed ethers of cellulose containing a higher alkyl radical of at least six carbon atoms and a lower alkyl radical of one to two carbon atoms.

7. Mixed ethers of cellulose containing a higher alkyl radical of from eight to eighteen carbon atoms and a lower alkyl radical of less than three carbon atoms.

8. Mixed ethers of cellulose containing at least 0.5 lower alkyl group having less than three carbon atoms and at least one higher alkyl group having at least six carbon atoms, for each glucose unit of the cellulose, said mixed ethers being soluble in toluene, kerosene and hot paraffin.

9. A "Lorol" ethyl cellulose containing at least 0.5 ethoxy group and at least one "Lorol" group for each glucose unit, which in the form of a white, waxy powder softens around 80°–85° C. and is soluble in toluene, kerosene and molten paraffin.

10. A "Stenol" ethyl cellulose which is soluble in toluene, kerosene and molten paraffin.

JOSEPH F. HASKINS.
JOSEPH F. HASKINS,
*Administrator of Deane C. Ellsworth, Deceased.*